United States Patent [19]

Wilson

[11] Patent Number: 4,940,911
[45] Date of Patent: Jul. 10, 1990

[54] SUBMERSIBLE PUMP EQUALIZER WITH MULTIPLE EXPANDING CHAMBERS

[75] Inventor: Brown L. Wilson, Tulsa, Okla.

[73] Assignee: Oil Dynamics, Inc., Tulsa, Okla.

[21] Appl. No.: 370,238

[22] Filed: Jun. 21, 1989

[51] Int. Cl.$^5$ .................... H02K 5/132; F04B 19/00
[52] U.S. Cl. .................................... 310/87; 310/89; 417/414; 417/423.11
[58] Field of Search .................. 166/105; 310/57, 87, 310/89, 43; 417/423.11, 414

[56] References Cited

U.S. PATENT DOCUMENTS

| | | | |
|---|---|---|---|
| 2,569,741 | 9/1951 | Arutunoff | 172/36 |
| 2,674,194 | 4/1954 | Arutunoff | 310/87 |
| 2,725,824 | 12/1955 | Arutunoff | 310/87 |
| 2,854,595 | 9/1958 | Aurtunoff | 310/87 |
| 2,951,165 | 8/1960 | Aruthunoff | 310/87 |
| 3,475,634 | 10/1969 | Bogdanov et al. | 310/87 |
| 3,571,636 | 9/1969 | Carle et al. | 310/87 |
| 3,770,635 | 11/1973 | Atendido et al. | 252/48.6 |
| 3,785,753 | 1/1974 | Bogdanov | 310/87 |
| 3,947,709 | 3/1976 | Waltman | 310/87 |
| 4,324,534 | 4/1982 | Sharkey | 417/414 |
| 4,377,763 | 3/1983 | Drake | 417/423.11 |
| 4,436,488 | 3/1984 | Witten | 417/414 |
| 4,477,235 | 10/1984 | Gilmer et al. | 310/87 |

FOREIGN PATENT DOCUMENTS 255034 1/1927 United Kingdom .................. 310/87

Primary Examiner—Peter S. Wong
Assistant Examiner—D. L. Rebsch
Attorney, Agent, or Firm—Head & Johnson

[57] ABSTRACT

An equalizer is located either between a downhole submersible pump and the motor or between a gas separator and its motor. There are at least two, and preferably three, flexible concentric bags spaced about a hollow tube with the first bag nested inside the second and the second is nested inside the third forming three separate spaces, i.e., a first space inside the first bag, a second space between the first and second bag, a third space between the second and third bag and a fourth space between the third bag and inside the housing and fifth space inside the hollow tube. When the motor oil heats up it flows into the first space, then through a passage with check valve into the inside of the hollow tube upwardly, and then across a passage to the second space. Another passage with another check valve connects the second space to the third space. The third space is connected by passage with a third check valve to the area outside the third flexible bag. An upper header and a lower header are attached to the hollow tube and the ends of the bags are sealed into these two headers. A shaft extends through the equalizer.

3 Claims, 2 Drawing Sheets

SUBMERSIBLE PUMP EQUALIZER WITH MULTIPLE EXPANDING CHAMBERS

BACKGROUND OF THE INVENTION

This invention relates to an improved pressure equalizing seal section also known as a protector, balance chamber or seal section (herein "equalizer") for use with a downhole electrical submersible pump.

One way of removing oil and other fluids from deep holes or wells drilled in the earth is by use of a submersible electrical pump, said pump unit which, as the name implies, is submerged in the liquid to be pumped. Submersible electrical motors employing oil as its lubricants are commonly accepted in the industry. Typically, an equalizer is located either between the pump and the motor or between the gas separator and the motor. This equalizer protects the motor oil from contamination by the well fluid, allows pressure equalization between the well annulus pressure and the motor internal pressure and connects the motor directly to the pump and provides a reservoir for volume changes as the motor heats up and cools down. These electrical motors are especially adapted for powering a pump located above and connected therethrough through coaxial spleening of their shafts. One of the characteristics of an oilfield electrical motor is that upon actuation thereof the oil lubricant becomes heated and expands upwardly along the shaft. Equalizers are interposed between the motor and the pump and having a shaft extension therein connecting the pump and the motor are well known in the industry. Various means have been devised to protect against direct contamination of the motor from either leakage of the upper seals or in event a barrier is ruptured. Perhaps the most widely used protection system is that described in U.S. Pat. No. 3,571,636. These equalizers worked well but are rather long and are thus bulky to handle.

It is therefore an object of this invention to present an improved equalizer with a novel flow path of the protecting fluid and of a compact nature.

SUMMARY OF THE INVENTION

This concerns an equalizer for use with a downhole submersible pump including a motor for driving it. The equalizer is a cylindrical shaped device with an inner tube and an outer concentrically spaced housing. There is an upper head and a lower head connected respectively to the lower and upper ends of the inner tube and the outer housing. A shaft extends through this inner tube with an annular space therebetween. A first, a second and a third bag or membrane surrounds the inner tube. These bags are made of flexible material which is highly impervious to the motor oil and the oil well liquids. The upper end of these elongated bags are sealed in spaced apart relationship to the upper header and the lower ends are sealed to the lower header. There is a first space inside the first bag, a second space between the second and first bag and a third space between the second and third bags and a fourth space between the third bag and the outer housing and a fifth space inside the inner tube. Motor oil from the motor is directed through a channel in the lower housing to the first space. The first space is connected to the annular space between the shaft and the inner tube by a passage with a check valve therein which permits flow of fluid only toward the annular space. This annular space is connected through a conduit in the upper housing to the second space. This second space is connected through a conduit in the lower heading through a check valve to the third space. The check valve permits flow only from the second space into the third space. The flow from the third space is connected through channels in the upper header through a check valve to the annular space between the third bag and the outer housing. This check valve permits fluid flow only from the third space to such annular space. This last annular space is connected through a passage in the upper header to the well fluid.

As the motor heats up, the motor oil expands and flows into the first space and thence through a check valve into the fifth annular space inside the hollow tube and is prevented from flowing upwardly by a seal around the shaft. Further heating of the oil causes additional expansion of the oil and the fluid then flows through a check valve into the second space and eventually through a third check valve into the third space. Any well fluid in any of the passages and annular spaces will be expelled by the expanding motor oil. After the motor has reached operating temperature the check valves will close and remain closed for the rest of normal operations. The differential volume caused by the heating and cooling of the motor will be handled by the three bags expanding and contracting in unison.

DETAILED DESCRIPTION

Figure 3:
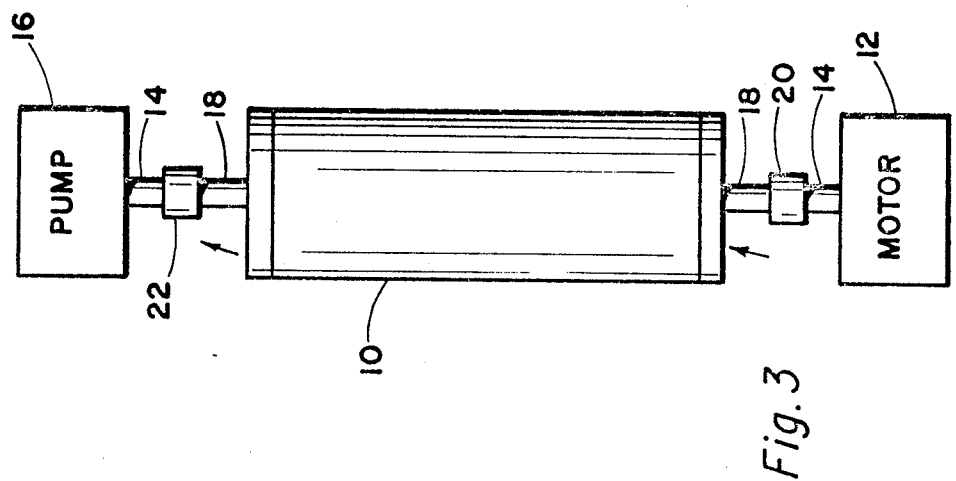
FIG. 3 illustrates how the equalizer is connected into the submersible pump system.

Reference is now made to the drawings and especially FIG. 3 in which the numeral 10 generally represents the protecting unit or equalizer which is interposed between a coaxial, submersible, electric motor 12 employing an oil surrounding the shaft 14 thereof as a lubricating medium and a pump 16. This embodiment is to be used in well bores normally having casings in which the diameter of the well or the casing is not over about 8 to 10 inches. The well bore is filled with a fluid which may be a mixture of crude oil, water and some gas. This well bore fluid is corrosive to the motor and must be prevented from contaminating the motor oil. The pump can typically be a multi-stage centrifugal pump designed with a wide range of capacities and may be installed in cases with as small as 5½ inch outside diameter and may have capacities from 150 barrels per day to 14,000 barrels per day. The output of the pump is directed through tubing to the surface where the pumped fluid is stored or pumped to its destination. Motor 12 is typically a three phase squirrel cage induction motor operating at 3,500 rpm's at full load on 60 Hz power and typically are filled with oil at the factory and available at sizes which include up to 240 horsepower at 5.5 inches outside diameter casing and larger. The motor is an electric motor which is typically used to drive the pump. Between the pump and the motor there is typically an equalizer. If there is a gas separator the equalizer is normally between the gas separator and the motor. The conventional equalizer performs five important functions:

1. Seals the motor oil from contamination by the well fluid;

2. Allows pressure equalization between the well annulus pressure and the motor internal pressure;
3. House the thrust bearing which absorbs unbalanced thrust from the pump;
4. Connects the motor directly to the pump; and
5. Provides a reservoir for volume changes as the motor oil heats up and cools down.

As shown in FIG. 3, vertical shaft 14 of the motor 12 is coupled by any suitable coupling means 20 to shaft 18 which extends through the equalizer or protector 10. The upper end of shaft 18 is connected by suitable coupling 20 to shaft 18 of the pump 16. Thus, shafts 14, 18 and 24 are interconnected so that they have common rotation. Any suitable coupling means may be employed on the respective shafts. Ambient well fluid surrounds the shafts, the motor, the equalizer and the pump. This well fluid may have wide range in temperature. In some areas the temperature is rather high and may be in excess of 150 degrees Fahrenheit.

Figure 1:
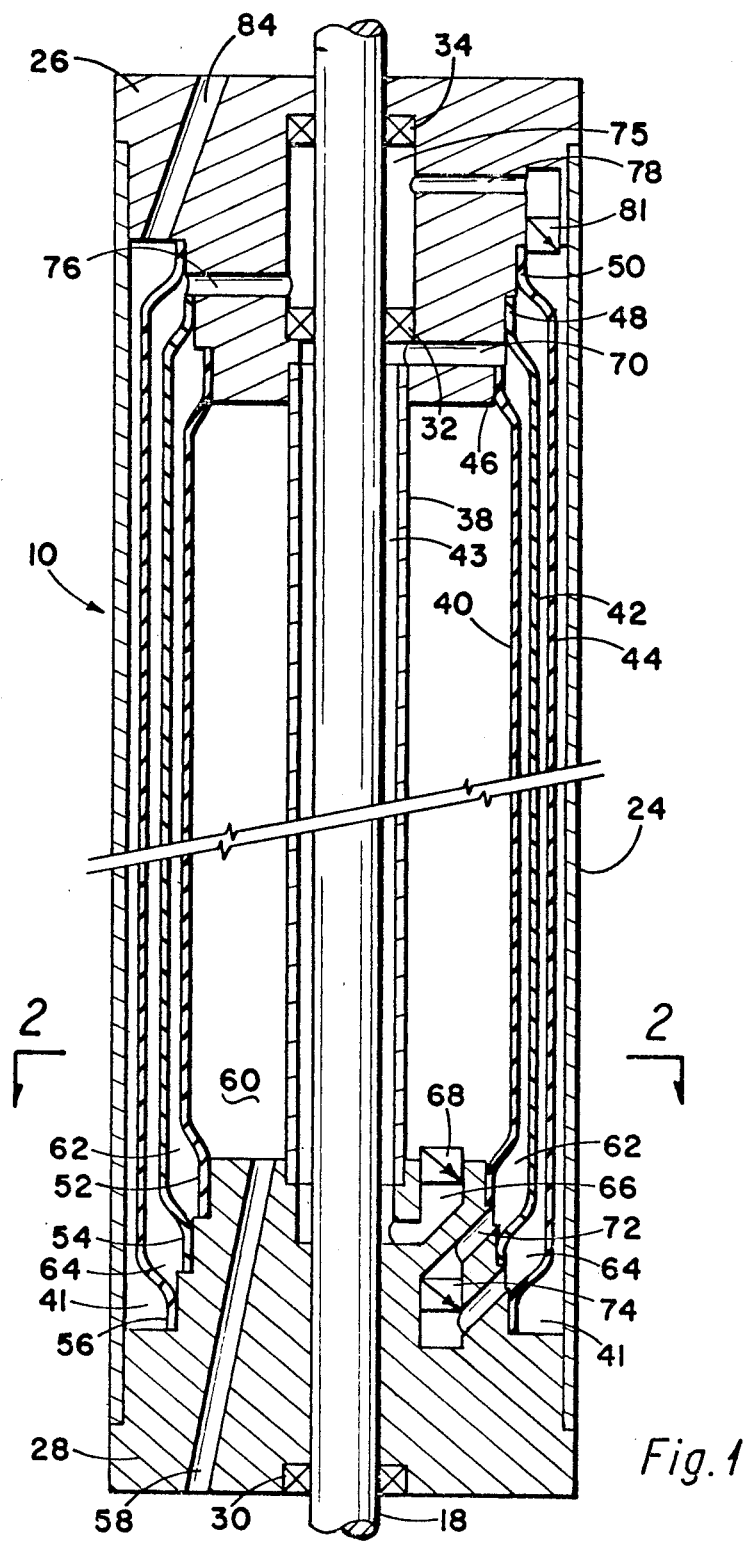
FIG. 1. The drawing shows, partly in cross section the improved equalizer of our invention.
Figure 2:
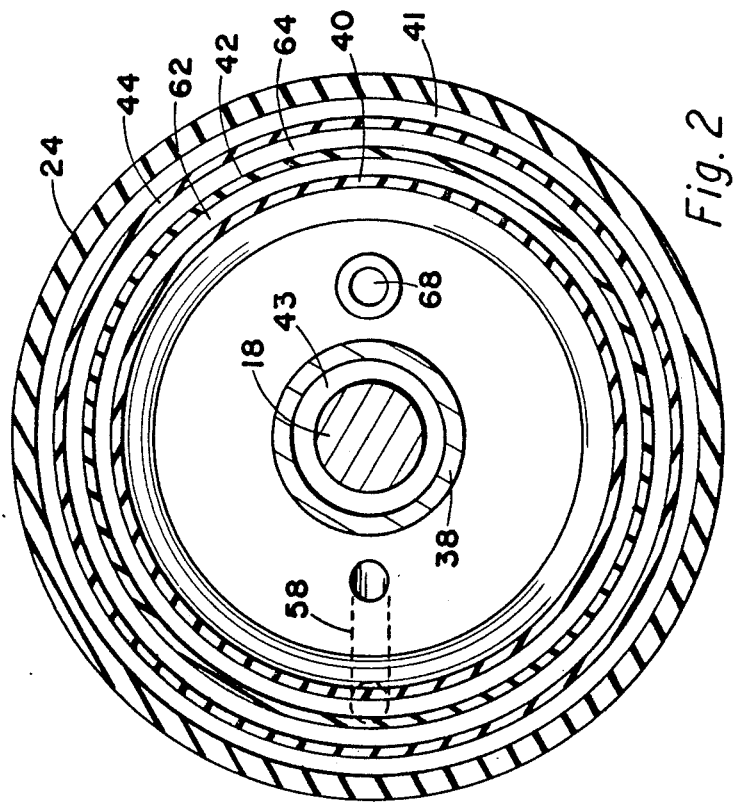
FIG. 2 is a view taken along the line 2—2 of FIG. 1.

Now referring especially to FIGS. 1 and 2, the equalizer 10 has a hollow housing 24 with an upper header 26 and a lower header 28. Shaft 18 passes through these headers 26 and 28. A lower or first seal 30 is between the shaft 18 and the header. There are two seals in the header 26. This includes a lower seal 32 and an upper seal 34. These seals 33, 32 and 34 permit shaft 18 to rotate with respect to the heads 26 and 28 and to prevent the escape of fluids along the shaft. A hollow tube 38 is connected between upper header 26 and lower header 28 and is concentric with and surrounds shaft 18. There is an annular chamber 40 between shaft 18 and hollow tube 38.

Concentrically disposed between hollow housing 24 and hollow tube 38 are three expandable and collapsible bags 40, 42 and 44. These bags have upper ends 46, 48 and 50 which are suitably sealed to the upper header 26. The lower end of these bags have ends 52, 54 and 56 which are suitably sealed to the lower header 28. There is thus formed three concentric annular chambers 60, 62 and 64, respectively, between bags 40, 42 and 44. There is also the annular chamber 41 between bag 44 and housing 24 and also chamber 43 between shaft 18 and tube 38 so that in effect we have five annular chambers between headers 26 and 28. A passage 58 extends through header 28 into annular chamber 60. Passage 58 is connected to the motor oil supply of the electric motor 12. There is a passage 66 in header 28 establishing fluid communication between the bottom of annular chamber 60 within bag 40 and the annular chamber 43 within hollow tube 38. A check valve 68 is in this passage permitting flow of fluid only from chamber 60. There is a passage 70 in upper header 26 which provides fluid communication between annular chamber 40 and the annular chamber 62 between bags 40 and 42. A passage 72 is in the header 28 and connects the interior 62 with the annular chamber 64 which is between the bags 42 and 44. A check valve 74 is in passage 72 and permits flow only from space 62 to space 64. A passage having sections 76, 78 in the upper header 26 connects the annular chamber 64 between bags 42 and 44 to the annular space 41 between the hollow housing 24 and the exterior bag 44. A third check valve 81 is in this passage and permits flow of fluid only out of the chambers 64. A passage 84 in upper header 26 connects the annular space 41 (between bag 44 and hollow housing 24) to the exterior of the hollow housing.

As stated above an electrical submersible pump requires some sort of seal to prevent the well fluid from entering the motor. It also requires a device to equalize the pressure within the motor to the pressure of the well bore. Further, some provision must be made to handle the motor oil expansion as the motor comes up to the operating temperature. The device shown in the drawings is known as an equalizer and performs all of these functions.

In operation the device of FIG. 1 is inserted into the pump system as shown in FIG. 3 between the motor 12 and the pump 16. The oil chambers and reservoirs of the motor 12 are filled with motor oil before the assembled unit is lowered into the well bore. After the unit is lowered into the well bore the motor is started to cause the pump to pump fluid to the surface through tubing (not shown) in a well known manner. As the motor runs it heats up and the motor oil expands and flows into the system described above with regard to FIG. 1. Understanding the function of the equalizer of my invention can be facilitated by following the flow path of the expanding motor oil. As the motor oil heats up, the motor oil expands and flows into the device 10. The motor oil follows through the passage 58 in the lower header 28 and into cavity 60 within bag 40. As the pressure builds up, the fluid flows through first check valve 68 and passage 66. Further expansion of the oil forces it through check valve 68 through channel 66 into annular chamber 43 where it flows through channel 70 in header 26 to chamber 62. As there is very little resistance in the check valve 68 the fluid will flow out of bag 40 without greatly expanding it. Expansion from this chamber is through check valve 74 into channel 72 which opens into chamber or space 64 between bag 42 and 44. Further expansion of the fluid will cause the fluid to flow upwardly in space 62 and then through passages 76, 78 in header 26 and space 75 between seals 32 and 34 which are also in header 26. The fluid, as it expands, flows through check valve 81 into annular space 41 between outer bag 44 and the hollow housing 24. Further expansions will cause the fluid to flow outwardly through passage 84 in upper header 26. To briefly summarize, the oil from the motor flows into the first bag 40 and is stopped from flowing around the shaft by seal 30. On initial start up the bag 40 is totally full. The excess oil volume due to expansion will cause the check valve 68 to open and the oil will then exit eventually into an area that surrounds the outside of the first bag 40 and inside the second bag 42 in space 62. The fluid is prevented from moving up the shaft by the seal 32. Excess oil will cause the second check valve 74 to open and the oil will flow into the space 64 which surrounds the outside of the second bag 42 and inside the first bag 44. The oil is prevented from flowing up the shaft by seal 34. Excess volume of oil will cause the third check valve 81 to open and that fluid will flow into the space 41 that surrounds the outside of the third bag 44 and the inside of the housing 24 and will communicate through passage 84 to the outside of the equalizer.

After the motor has reached operating temperatures, the check valves will close and remain closed for the rest of the normal operations. The differential volume caused by the heating and cooling of the motor will be handled by the bags 40, 42 and 44 expanding and contracting in unison. Thus, there will be pressure equalization between the pressure of the motor oil and the pressure of the fluid the well bore. There is no danger of the well fluid contacting the motor oil which is in contact with the motor through the normal flow path because the check valves will prevent the flow of well fluids back into the bags. In the configuration shown in FIG. 1 there are three such check valves and they would all have to leak before the well fluid could reach the motor. If either bag 40, 42 or 44 failed then the other two bags would still function to prevent the contaminating well fluids from reaching the motor through passage 58.

Thus, it is clear that the system of FIG. 1 is a very, very reliable and effective configuration. By having bags 40, 42 and 44 concentric it is clear that it is much more compact than if we had placed them in tandem. Thus, the cost is much lower.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A protective device for insertion between a submersible electric motor in a well bore and a pump located above and driven by the motor, said motor filled with a fluid, said device comprising:

an upper header and a lower header;

a hollow housing extending between said upper and lower headers and fixed thereto;

a tube concentrically mounted within said hollow housing and extending between said upper and lower headers;

a first expandable bag-like membrane having a first end and a second end, said first end sealed to said upper header and said lower end sealed to said lower header, said first membrane surrounding said tube;

a second expandable bag-like membrane having a first end and a second end and surrounding said first bag member, said first end and said second end respectively sealed to said upper header and said lower header;

a third expandable bag-like membrane having a first end and a second end and surrounding said second bag, said first end and said second end sealed respectively to said upper header and said lower header;

there being formed a first chamber between said first bag and said hollow tube, a second chamber between said first and second bags; a third chamber between said second and third bag, a fourth chamber between said third bag and said housing and a fifth chamber within said tube;

a first passage through said lower header from the exterior to the first chamber;

a second passage through said lower header and a check valve therein, said second passage extending from said first chamber to the interior of said hollow tube;

a third passage which extends through a portion of said upper header from the fifth chamber to said second bag;

a fourth passage in the lower header and a check valve therein, said passage extending from said second chamber to said third chamber;

a fifth passage through said upper header extending from said third chamber to the space between said third bag and the interior of said housing and a check valve in said fifth passage; and a fifth passage without check valve through said upper header from said fourth chamber to the exterior of the device.

2. An equalizer for use with a downhole submersible pump and insertable between the pump and the electric motor which comprises:

an upper header and a lower header;

a hollow cylindrical housing connected between said headers;

a hollow tube connected between said headers and concentrically mounted with and within said housing;

at least a first and a second flexible bag concentrically spaced about said hollow tube each having an upper end and a lower end with the upper end being sealed to the upper header and the lower end being sealed to the lower header;

a first passage means through said lower header from the exterior thereof to the interior of said first bag;

a second passage means with a check valve therein between the interior of said first bag and the interior of said hollow tube;

a third passage means with a check valve therein and forming full communication between the interior of said hollow tube and the interior of said second bag and exterior of said first bag;

and fourth passage means communicating the space between said first and second bag to the exterior of the housing through a passage in said upper header.

3. A device as defined in claim 1 in which there is a serpentine flow path from the motor through the passage means of said device to the exterior thereof and in which check valves therein permit flow of fluid in said paths only from the direction of the motor to the exterior of the device.

* * * * *